United States Patent [19]
Hill et al.

[11] Patent Number: 6,013,696
[45] Date of Patent: Jan. 11, 2000

[54] FRICTION MEMBER AND METHOD FOR MANUFACTURE THEREOF

[75] Inventors: Larry Oather Hill, Frankfort; Richard S. Goodlin, McArthur; Christopher Roy Mathews; Mahendra Mehta, both of Pittsfield, all of Ohio

[73] Assignee: The Mead Corporation, Dayton, Ohio

[21] Appl. No.: 09/010,914

[22] Filed: Jan. 22, 1998

[51] Int. Cl.[7] .............................. C08J 5/14; C08J 67/00; C08J 61/28; C08J 61/06; C08J 75/04

[52] U.S. Cl. ............................. 523/149; 524/15; 524/35; 524/601; 524/611; 524/612; 428/311.17; 523/156

[58] Field of Search ...................... 523/156, 149; 524/15, 35, 601, 611, 612; 428/306.6, 311.71

[56] References Cited

U.S. PATENT DOCUMENTS

| | | | |
|---|---|---|---|
| 2,819,987 | 1/1958 | Maierson et al. | 442/326 |
| 3,226,527 | 12/1965 | Harding | 219/384 |
| 3,316,138 | 4/1967 | Taylor | 156/267 |
| 4,045,608 | 8/1977 | Todd | 428/251 |
| 4,137,214 | 1/1979 | Socharski | 523/156 |
| 4,147,242 | 4/1979 | Fujioka | 192/4 |
| 4,218,606 | 8/1980 | Whitman, III | 219/121 |
| 4,631,209 | 12/1986 | Baker et al. | 427/392 |
| 4,639,392 | 1/1987 | Nels et al. | 442/378 |
| 4,856,649 | 8/1989 | Inoue | 206/204 |
| 4,923,608 | 5/1990 | Flottmann et al. | 210/500 |
| 5,083,650 | 1/1992 | Seiz et al. | 192/107 |
| 5,101,953 | 4/1992 | Payvar | 192/107 |
| 5,127,949 | 7/1992 | Nakazawa et al. | 106/36 |
| 5,176,236 | 1/1993 | Ghidorzi et al. | 192/107 |
| 5,259,401 | 11/1993 | Lange et al. | 131/281 |
| 5,263,667 | 11/1993 | Horstman | 244/209 |
| 5,332,075 | 7/1994 | Quigley et al. | 192/107 |
| 5,395,864 | 3/1995 | Miyoshi et al. | 523/155 |
| 5,453,317 | 9/1995 | Yesnik | 428/283 |
| 5,520,866 | 5/1996 | Kaminski et al. | 264/112 |
| 5,529,666 | 6/1996 | Yesnik | 162/136 |
| 5,639,804 | 6/1997 | Yesnik | 523/156 |
| 5,707,916 | 1/1998 | Snyder et al. | 502/180 |
| 5,830,566 | 11/1998 | Kimura et al. | 428/323 |
| 5,856,244 | 1/1999 | Lam et al. | 442/73 |

OTHER PUBLICATIONS

Lewis Sr., Richard J.; Hawley's Condensed Chemical Dictionary 12th Ed., Van Nostrand Reinhold New York (p. 946), 1993.

*Primary Examiner*—Vasu Jagannathan
*Assistant Examiner*—Callie E. Shosho
*Attorney, Agent, or Firm*—Thompson Hine & Flory LLP

[57] ABSTRACT

A method for manufacturing a heat resistant friction material which comprises forming pores in the surface of the friction material, the pores being formed with a controlled pore size, depth, pattern, orientation and distribution.

22 Claims, 1 Drawing Sheet

FRICTION MEMBER AND METHOD FOR MANUFACTURE THEREOF

BACKGROUND OF THE INVENTION

The present invention relates to the manufacture of a friction material and the friction material produced thereby and, more particularly, to the manufacture of a friction paper having improved cooling characteristics.

Friction members such as clutch plates and bands are widely used in mechanical devices such as automatic transmissions. Typically, the friction member is made from a highly heat-resistant material which is bonded to a backing member which consists of a plate of metal or other material resistant to heat deformation. The friction material must be compliant but resistant to fatigue, abrasion and heat, have desirable and sustainable frictional properties, and a long service life. If any one of these properties is not satisfied, the friction material may fail. Previously, asbestos fibers were included in friction materials. Now, however, due to health and environmental problems, asbestos is no longer being used. More recently, friction materials have been made by impregnating a paper or fiber non-woven mat materials with phenolic or other resins. These friction materials, however, do not rapidly dissipate the high heat generated.

A clutch plate for a wet clutch assembly includes a facing plate which interacts frictionally with an adjacent reaction plate to engage and disengage the clutch. The clutch plate facing and the adjacent reaction plate facing are submerged in a liquid medium which comprises a transmission fluid. The engagement of the clutch plate with the reaction plate causes a rapid and intense increase in heat. Under such adverse condition, decomposition of the transmission fluid is common and thermal deformation of the engaging parts has been observed, giving rise to transmission problems. It has been observed that the flow of transmission fluid through the friction material which accompanies the application of pressure to the friction plate as it engages the reaction member creates a cooling effect on the friction medium. Previously, the inherent porosity present in saturated cellulosic paper has been relied upon to provide the paths through which the transmission fluid flows when pressure is applied to engage the clutch plate with the reaction plate. The porosity of cellulosic paper is very random with respect to pore size, distribution and depth of the pores and the actual number of pores. Consequently, these materials provided non-uniform and inefficient cooling of the transmission fluid, which may contribute to reduced heat resistance and unsatisfactory coefficient of friction performance. To overcome these problems, various groove patterns have been employed on the friction facings of clutch plates for wet clutches to move the transmission fluid across the facing to remove heat and reduce the temperature gradient across the facing surface from the inner edge to the outer edge of the facing. For example, U.S. Pat. No. 4,045,608 to Todd; U.S. Pat. No. 5,101,953 to Payvar and U.S. Pat. No. 5,176,236 to Ghidorzi et al. disclose facing materials for clutch plates which are grooved to provide improved oil flow over the surface of the friction facing. Such grooves, however, have proved to be generally ineffective and even detrimental to the performance of the clutch plates because the grooves inherently reduce the effective surface area of the friction material. Accordingly, there is a need in the industry for an improved friction member which prevents or reduces thermal degradation of the friction member and eliminates or reduces thermal deformation of the engaging plates while retaining an effective surface area to improve the performance of the friction member.

SUMMARY OF THE INVENTION

In accordance with the invention, a pore structure is formed in the surface of a friction material, wherein the pores are of a predetermined size and distribution. The friction material of the invention is capable of exhibiting reduced thermal degradation of the friction member and thermal deformation of mechanical devices which employ the friction members as well as prolonging the effective life of the transmission.

The pore structure can be created by any method which will provide pores having a predetermined pore size in a predetermined pattern in the surface of the friction material. In a preferred aspect of the invention the pores are formed by a computer controlled laser to maximize the effectiveness of the pore structure with respect to the pore size, the number, the depth and the distribution of pores. Typically, the axis of the pores will be parallel to one another and perpendicular to the surface of the sheet, although in some applications the pores can be set at a predetermined angle to the sheet and to one another. Thus, the present invention provides a friction material in which a pore structure can be provided which provides enhanced cooling. The number, size, depth, orientation and distribution of the pores can be adjusted to provide the optimum combination of frictional and heat resistant characteristics for the particular application. The term "pore structure" as used herein refers to the array or arrangement of pores as contrasted with the individual pore itself. The term "pore structure" expressly excludes the pore structure that inherently exists in the interstitial spaces of a fibrous array. The term "friction material" refers to the paper or composite that forms the frictional facing of the friction member. The term "friction member" refers to the combination of the facing and the backing structure.

Accordingly, it is an object of the present invention to provide a method for manufacturing a friction material having improved cooling characteristics.

It is another object of the present invention to provide a friction material manufactured in accordance with the method described herein.

Other objects and advantages of the present invention will become apparent from the following description, the appended claims and the attached drawings.

DETAILED DESCRIPTION OF THE INVENTION

Figure 1:
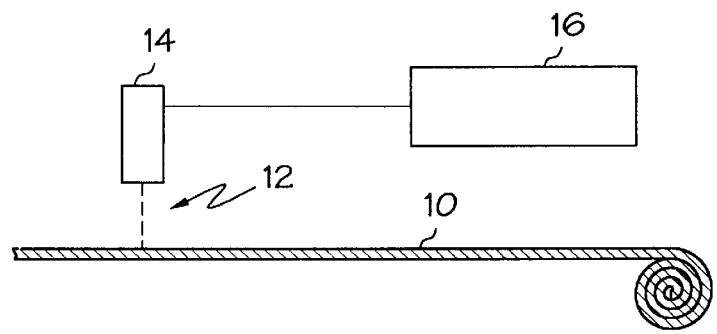
FIG. 1 is a schematic representation illustrating the formation of pores in a continuous web using a laser in accordance with the present invention.

It has been found that improved thermal resistance and performance efficiency of friction plates can be achieved by creating a patterned pore structure in the surface of the friction material on the friction plate. The pore structure is characterized as containing a plurality of pores in which the pores are of a predetermined size, orientation and distribution on the surface of the friction material. It is believed that transmission fluid in the pores effectively cools the friction member as the fluid is squeezed laterally throughout the wet friction material as the friction member becomes engaged under pressure with a reaction member. Preferably, the pore structure is produced using a laser to form the pores although any method for forming the pores can be used as long as the pores are formed in the surface of the friction material in accordance with the predetermined pattern. While any of the various lasers employed to create pores or perforations in paper objects can be used, carbon dioxide ($CO_2$) laser has been found to be particularly effective in forming pores in a resin-saturated cellulosic paper in accordance with the present invention.

In a preferred aspect, the predetermined pore size, pore depth, number of pores, and distribution pattern of the pores formed in the surface of the friction member are controlled from a computerized program such as a Computer Assisted Manufacturing (CAM) program. The pore size, number of pores, depth, orientation and the pattern of the pores can be changed by modifying the laser power, spot size and location pattern. The pore size, i.e., the pore diameter effective to provide the desired results in accordance with the present invention is in the range of about 0.001 to 0.1 inch and the pores are spaced about 0.01 to 0.5 inch (measured center to center) apart. Preferably the pores have an average diameter of about 0.01 inch and are spaced about 0.1 inch apart as measured from the center of one pore to the center of an adjacent pore. The pores can partially or completely penetrate the friction member. Preferably, the pores partially penetrate the friction material to an average depth of about 20 to 80 percent of the thickness of the friction material. The thickness of the friction material typically runs from about 0.01 to about 0.08 inch. The number of pores present in the surface of the friction material should be the sufficient to provide effective cooling of the friction member while also providing a sufficient surface area on the friction material to be an effective friction member. While the pores will typically be circular in cross-section, using a laser other cross-sectional shapes can readily be obtained including square, polygonal, or clover leaf or lobed pattern.

The pattern of the pore structure will vary with the application of the friction paper. In some cases the pores may be arranged in rows and columns. The rows and columns may be offset from one another. In other cases the pores may be arranged in circular arrays. In some applications it may be desirable to have more pores in certain areas than in others, for example, areas subject to extensive heating may contain more pores or pores that are larger or deeper than areas where heating is less. One of the advantages of the invention is that the pore pattern is variable and controllable and can be adapted for a particular application.

As indicated earlier, it is believed that pressure applied to the friction member causes the fiction member to engage with the reaction plate and, under such pressure, the transmission fluid contained in the pores is squeezed laterally throughout the friction member. The flow of the transmission fluid is believed to cool the friction plate so that thermal degradation of the transmission fluid and the friction member is reduced and thermal deformation of the friction plate is prevented.

The friction material of the present invention is a resilient, heat resistant member including of one or more layers of fibrous mat impregnated with a thermosetable resin. The fibrous mat may be any fibrous non-woven or woven mat suitable for use as a wet friction member. For example, U.S. Pat. No. 5,083,650 to Seiz et al. describes friction materials formed substantially entirely of aramid polymer staple fibers. Other fibrous materials that can be used include cotton fiber, glass fibers, carbon fibers such as graphite fibers, and cellulose fibers. Preferably the fibrous mat is a paper having a basis weight of about 80 to 800 lbs/3000 $ft^2$, and most preferably about 100 to 300 lbs/3000 $ft^2$.

The impregnation of the cellulosic material with the thermosetable resin may be accomplished in a conventional manner directly on the papermaking machine or off the papermaking machine at a later stage in the formation of the friction member. After impregnation of the fibrous material with the thermosetable resin, the impregnated fibrous material is cured in a conventional manner.

Figure 3:
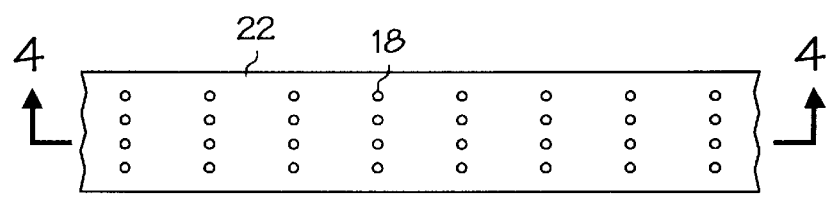
FIG. 3 is a top plan view of a friction member in accordance with the present invention.
Figure 4:
FIG. 4 is a cross-sectional view of the friction member shown in FIG. 3 taken along lines 3A—3A.
Figure 5:
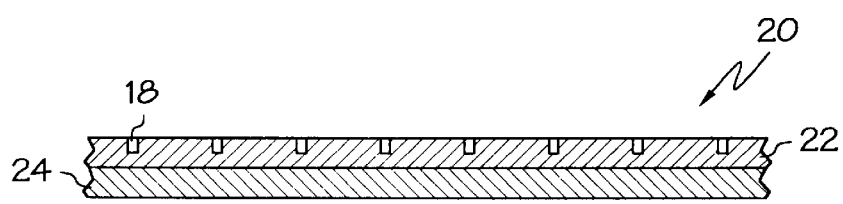
FIG. 5 is a cross-sectional view of a friction plate employing the friction member of the present invention bonded to a backing member.

The pore structure can be introduced into the various points in the formation of the friction material. In accordance with one aspect of the invention as shown in FIG. 1, a continuous web 10 of a raw paper traveling in the direction of the arrow is perforated with a laser beam 12 from a laser 14 controlled by a controller 16 to create a plurality of pores 18 in the web 10 (FIGS. 3–5). The formation of the pores 18 can be accomplished by one or more lasers 14 depending on the required pattern, pore diameter and line speed. The lasers may be aligned at an angle to the paper if it is desired to change the orientation of the pores.

Figure 2:
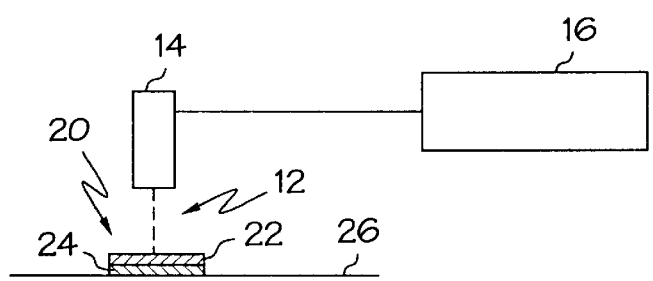
FIG. 2 is a schematic representation illustrating the formation of pores in a friction plate using a laser in accordance with the present invention.

The web can be impregnated with the thermosetable resin before or after the web is perforated by the laser to form the pores. Where the pores are formed prior to impregnation with the resin, the impregnated web containing the pores is compressed to force the resin into the web so that the pores are not clogged with the resin. The cured, resin-impregnated friction material 22 (FIGS. 2 and 5) is then bonded to a backing member 24 to provide the friction member 20 (FIGS. 2 and 5). In some instances it may be desirable to form the pore structure in the friction material or the finished friction member. In those instances, the assembled friction member 20 containing the friction material 22 bonded to the backing member 24 is placed on a platform 26 and the pore structure is then formed directly in the surface of the friction material 22 as shown in FIG. 2.

The resin used to impregnate the cellulosic material of the present invention is any conventional thermosetable resin capable of withstanding the heat and premium conditions present in an automatic transmission as well as any solvent properties of the transmission fluid towards the resin. Particularly useful thermosetable resins include novolak resins, melamine-formaldehyde resins, phenolics resins, polyester resins, urethane resins, epoxy resins, aminoplast resins, cashew nut shell resin, and mixtures thereof. Typically, in the formation of wet friction materials for use in automatic transmissions, the amount of thermosetable resin used is sufficient to impregnate but significantly less than that which would cause complete saturation of the cellulosic material. For example, it is preferred that the resin coat the cellulosic fibers making up the mat but not fill the voids between the fibers. The amount of thermosetable resin used to impregnate the fibrous material should be sufficient to provide the necessary characteristics attributal to an effective friction member for use in a transmission. Typically, the fibrous material is impregnated with about 30 to 60% thermosetable resin by weight.

Various other conventional fillers used in the manufacture of friction materials, such as silica fillers, iron oxide, mica, diatomaceous earth, graphite flakes and the like are also suitable for use in the present invention. The choice and amounts of such filler depend on the particular requirements of the friction material.

The backing member is preferably manufactured from a deformation-resistant metal-based material such as steel.

Those skilled in the art will appreciate that modifications and variations of the present invention are possible without departing from the scope of the invention.

What is claimed is:

1. A method for manufacturing a heat resistant friction material which comprises impregnating a fibrous mat with a thermosetable resin and before or after said impregnating step, forming pores in the surface of said friction material, said pores being separate and distinct from the inherent interstitial spaces in said fibrous mat, wherein said pores are not impregnated with resin and the pore size, depth, pattern, orientation or distribution are selected to enhance cooling and prevent deformation of said friction material.

2. The method of claim 1 wherein said pores are formed by one or more lasers.

3. The method of claim 1 wherein said friction material has a thickness of about 0.01 to 0.08 inch and said pores penetrate the surface of said friction material to a predetermined average depth of about 20 to 80 percent of the total thickness of said friction material.

4. The method of claim 3 wherein said pores serve as reservoirs for a fluid which acts as a coolant to remove heat from the surface of said friction material during engagement of said friction member with a reaction member.

5. The method of claim 1 wherein said pores have an average diameter of about 0.001 to 0.1 inch and are spaced about 0.01 to 0.5 inch apart.

6. The method of claim 5 wherein said pores have an average diameter of about 0.01 inch and are spaced about 0.1 inch apart.

7. The method of claim 1 wherein said friction material is formed from a non-woven cellulosic paper impregnated with a thermosetable resin.

8. The method of claim 7 wherein said thermosetable resin is selected from the group consisting of novolak resins, melamine-formaldehyde resins, phenolics resins, polyester resins, urethane resins, epoxy resins, aminoplast resins and cashew nut shell resin, and mixtures thereof.

9. A friction material comprising a thermosetable resin-impregnated fibrous mat having a patterned pore structure in the surface thereof, said pores not being impregnated with resin, said pores being separate and distinct from the inherent interstitial spaces in said fibrous mat, and said pores having a controlled pore size, depth, pattern, orientation and distribution.

10. The friction material of claim 9 wherein said thermosetable resin is selected from the group consisting of novolak resins, melamine-formaldehyde resins, phenolics resins, polyester resins, urethane resins, epoxy resins, aminoplast resins and cashew nut shell resin and mixtures thereof.

11. The friction material of claim 9 wherein said friction material has a total thickness of about 0.01 to 0.08 inch and said pores penetrate said friction material to a predetermined average depth of about 20 to 80 percent of the total thickness of said friction material.

12. The friction material of claim 11 wherein said pores have an average diameter of about 0.001 to 0.1 inch and are spaced about 0.01 to 0.5 inch apart.

13. The friction material of claim 12 wherein said pores have an average diameter of about 0.01 inch and are spaced about 0.1 inch apart.

14. The friction material of claim 11 wherein said pores serve as reservoirs for a fluid which acts as a coolant to remove heat from the surface of said friction material during engagement of said friction member with a reaction member.

15. The friction material of claim 9 wherein said pores are created by one or more lasers in accordance with a pattern controlled by a computer program.

16. The friction material of claim 9 wherein said friction material is bonded to a backing member wherein said pores are distributed on the friction member surface opposite said backing member.

17. The friction material of claim 16 wherein said backing member is a steel plate.

18. The friction material of claim 16 wherein said friction material bonded to said backing member is useful as a clutch plate.

19. The friction material of claim 9 wherein said pores have a size and depth and are arranged in a pattern which provides improved heat resistance when said friction material is employed on a friction member.

20. A resin-impregnated paper which is useful as a frictional material, said paper having a pore structure formed in the surface thereof wherein said pore structure is separate and distinct from the inherent interstitial spaces in said resin-impregnated paper and said pore structure is not impregnated with resin and provides maximum cooling or heat resistance in applications in which the friction facing is used.

21. A method for manufacturing a heat resistant friction material which comprises impregnating a fibrous mat with a thermosetable resin and forming pores which partially penetrate the surface of said friction material, wherein said pores are separate and distinct from the inherent interstitial spaces in said material, said pores extend between 20% and 80% of the depth of said material and said pores are not impregnated with resin and have a size, pattern, orientation or distribution which enhances cooling and prevents deformation of said friction material.

22. A method for manufacturing a heat resistant friction material which comprises impregnating a fibrous mat with a thermosetable resin and forming pores in the surface of said friction material, wherein said pores are separate and distinct from the interstitial spaces in said material, said pores are not impregnated with resin, and said pores have a size, pattern, orientation or distribution which enhances cooling and prevents deformation of said friction material.

* * * * *

UNITED STATES PATENT AND TRADEMARK OFFICE
CERTIFICATE OF CORRECTION

PATENT NO.   : 6,013,696
DATED        : January 11, 2000
INVENTOR(S)  : Larry Oather Hill et al.

It is certified that error appears in the above-identified patent and that said Letters Patent is hereby corrected as shown below:

On the title page, item:

[75], Inventors, "Larry Oather Hill, Frankfort; Richard S. Goodlin, McArthur; Christopher Roy Mathews; Mahendra Mehta, both of Pittsfield, all of Ohio" should read --Larry Oather Hill, Frankfort; Richard S. Goodlin, McArthur, both of Ohio; Christopher Roy Mathews; Mahendra Mehta, both of Pittsfield, Massachusetts--.

Claim 22, col. 6, line 53, before "interstitial" insert --inherent--.

Signed and Sealed this

Twenty-sixth Day of December, 2000

Attest:

Attesting Officer

Q. TODD DICKINSON

Director of Patents and Trademarks